Jan. 9, 1923.
W. T. YARD.
CORN HUSKER.
ORIGINAL FILED APR. 22, 1920.
1,441,960.
2 SHEETS—SHEET 1.
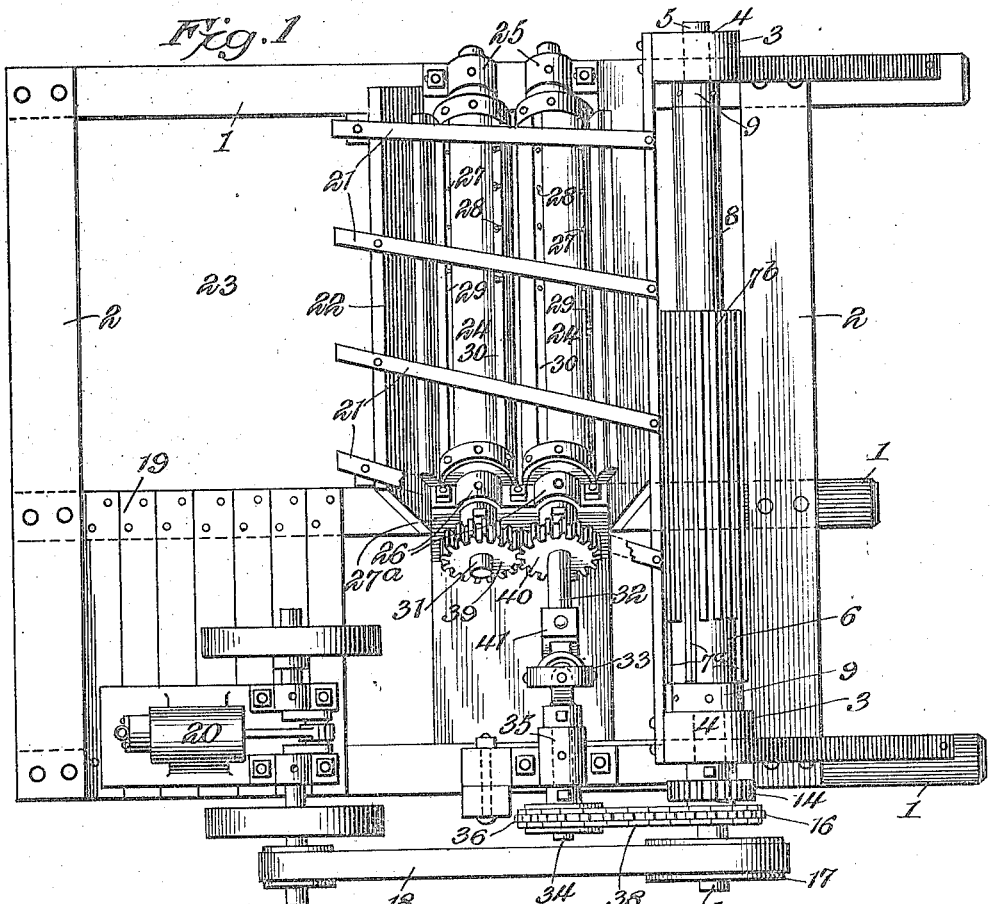
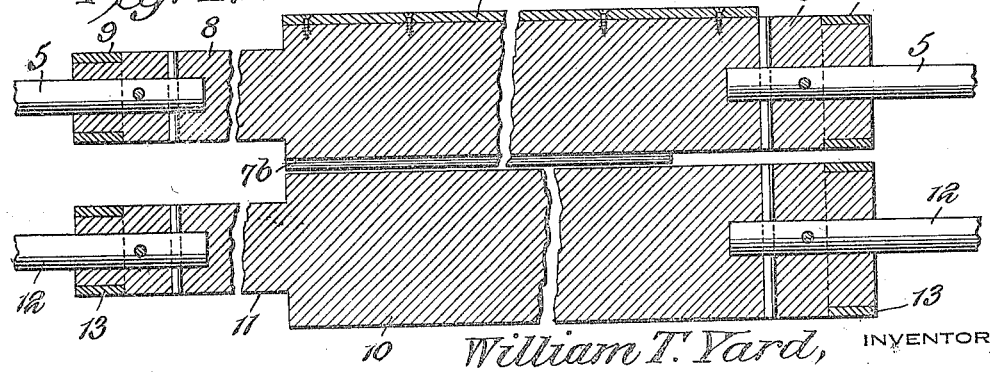
WITNESSES
Howard D. Orr.
F. T. Chapman
William T. Yard, INVENTOR,
BY E. G. Siggers.
ATTORNEY Jan. 9, 1923.
W. T. YARD.
CORN HUSKER.
ORIGINAL FILED APR. 22, 1920.
1,441,960.
2 SHEETS—SHEET 2.
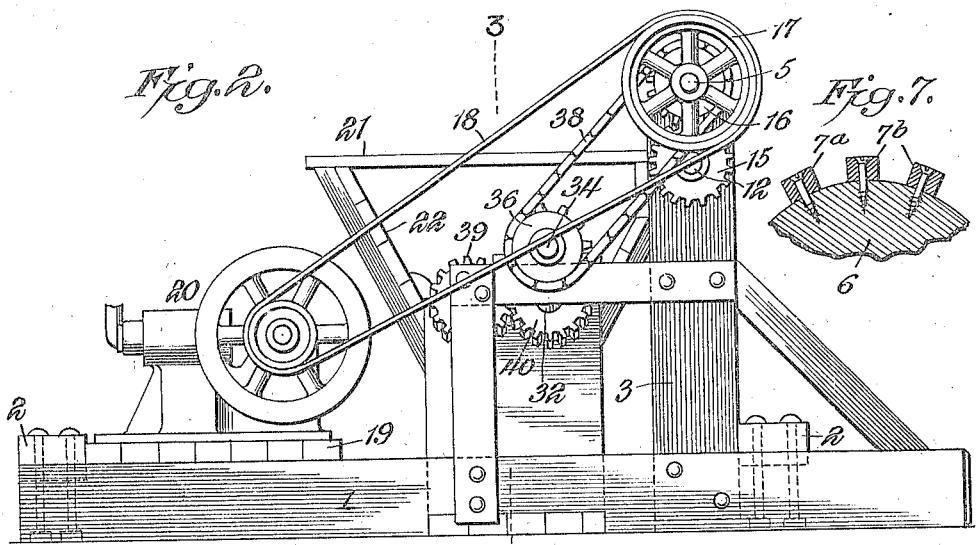
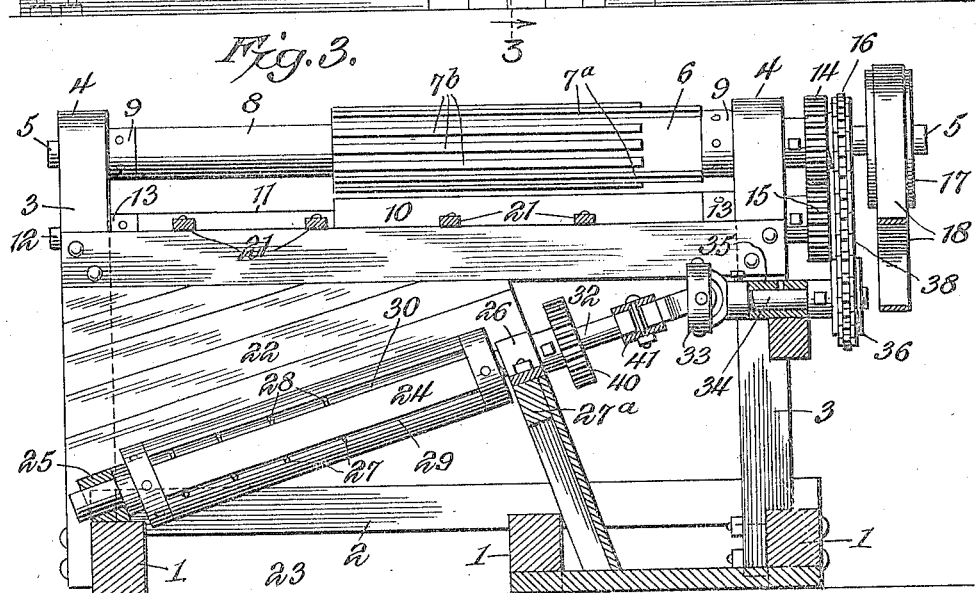
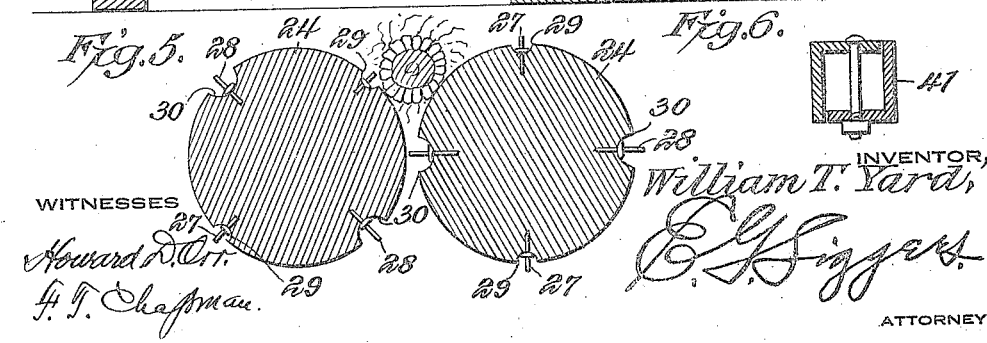
INVENTOR,
William T. Yard,
WITNESSES
ATTORNEY Patented Jan. 9, 1923.

1,441,960

UNITED STATES PATENT OFFICE.

WILLIAM T. YARD, OF TRENTON, NEW JERSEY; EMMA YARD EXECUTRIX OF SAID WILLIAM T. YARD, DECEASED.

CORN HUSKER.

Application filed April 22, 1920, Serial No. 375,808. Renewed November 29, 1922.

*To all whom it may concern:*

Be it known that I, WILLIAM T. YARD, a citizen of the United States, residing at Trenton, in the county of Mercer and State of New Jersey, have invented a new and useful Corn Husker, of which the following is a specification.

This invention has reference to corn huskers and its object is to remove the ears of corn, deliver the stalks with the husks still attached, to a suitable point of disposal and deliver the ears of corn in most part free from husks and silk, to another point of disposal.

In accordance with the invention there is provided a suitable support, which may, for convenience, be in the form of a sled for ready transportation to the field, and on the support there are mounted two sets of rollers each extending crosswise of the support with the rollers of one set in superposed order and approximately horizontal and those of the other set side by side to one side of the upright plane of the first named rollers and slanting downwardly. The rollers are connected for simultaneous movement in proper directions and the support may carry a prime mover for the rollers, conveniently in the form of an explosion engine.

The arrangement of the invention is such that corn stalks with the corn thereon are presented parallel with the first named rollers so that the corn stalks may be caused to pass between the rollers substantially parallel therewith, causing the snapping of the ears of corn from the stalks and, at the same time, forcing the ears of corn from the husks. The snapped ears thereupon fall upon an intermediate part of the second pair of rollers to be engaged thereby, causing the ears to move toward the lower end of the pair of rollers and, during their progress, these ears are denuded of cornsilk and any parts of the husks which may happen to remain on the ears, so that the ears on reaching the lower or discharge end of the second pair of rollers need no further treatment but may be deposited in suitable containers or upon a suitable conveyor.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

Fig. 1 is a plan view of a corn husking machine embodying the invention.

Fig. 2 is a side elevation thereof.

Fig. 3 is a section on the line 3—3 of Fig. 2.

Fig. 4 is a longitudinal section through the pair of husking rollers.

Fig. 5 is a cross section through the pair of de-silking rollers.

Fig. 6 is a cross section of a universal joint employed in the structure.

Fig. 7 is a detailed cross section of a portion of one of the snapping rollers.

Referring to the drawings:

There is shown a support formed of longitudinal and cross beams 1 and 2 respectively, and near one end the longitudinal beams 1 carry uprights 3. The structure of the support is made of a character permitting the use of the longitudinal beams 1 as runners, if so desired, so that the husker may be drawn where corn is in the shock and the removal of the ears from the corn stalks may be performed without the necessity of transporting the corn from the field to some other point, thereby saving a material amount of handling.

The posts 3 are provided on the upper ends with journal bearings 4. Mounted on the journal bearings are the outer ends of alined stub shafts 5 together carrying a roller 6 provided with a circumferential series of spaced slats or ribs 7 some of which continue close to one end of the roller and others of which stop short of the same end, the longer slats being designated by $7^a$ and the shorter slats by $7^b$. All the slats are evened up or brought into the same radial plane at a point somewhat beyond the middle point of the roller, and from thence to the other end of the roller the peripheral portion of the roller is reduced in diameter as indicated at 8. With the roller 6 made of wood the ends are protected by metal bands 9. As indicated in Figs. 1, 3 and 7 the slats 7 are of substantially rectangular cross section.

Opposed to the roller 6 is another smooth faced roller 10 (see Fig. 4), and this roller has one end reduced in diameter as indicated at 11. The roller 10 may be of somewhat greater body diameter than the roller 6 to compensate for the increased diameter of the roller 6 produced by the slats 7, so that the surface speed of the two rollers is the same where they are close together. The roller 10 is provided with terminal alined stub shafts 12 and has protecting wear bands 13 at the ends like the roller 6. The stub shafts 5 and 12 of the two rollers, at one end of the pair of rollers, are provided with intermeshing gear wheels 14 and 15 respectively so that with one of the rollers driven the other will rotate in the opposite direction at the same speed. Furthermore, the stub shaft 5 at that end of the roller 6 carrying the gear wheel 14, also carries a sprocket pinion 16 and a belt pulley 17 to which is connected a belt 18 for the application of power.

While the husker may be driven in any suitable manner it is desirable that the driving means should be carried by the main frame of the husker, thus facilitating transportation and making it possible to convey the husker to the field and there use it at any portion of the field desired. Therefore the main frame is provided with a platform 19 at any suitable point thereon, and mounted on the platform 19 is a prime mover 20 which may conveniently be in the form of an explosion engine to which the belt 18 is connected. This makes the entire machine self-contained and therefore advantageous in being readily transportable.

The two rollers 6 and 10 constitute snapping rollers and are arranged one above the other crosswise of the main frame in a substantially vertical plane. Approaching the mouth of the pair of rollers 6 and 10 is a series of substantially horizontal slats 21 in suitably spaced relation and secured to the top of the hopper 22. The slats 21 diverge toward the mouth of the snapping rollers 6 and 10 from the other side of the hopper 22 where the construction of the main frame is such as to leave a feeding space 23 in which an operator may stand and feed corn stalks one at a time to the mouth of the rollers in substantially parallel relation thereto.

At the bottom of the hopper 22 there is journaled a pair of rollers 24 of similar construction, with one end of the pair of rollers mounted in journal bearings 25 and the other end of the pair of rollers mounted in journal bearings 26 with the last named journal bearings carried by an elevated support 27$^a$ whereby the pair of rollers is inclined, the high end of the pair being under an intermediate portion of the slatted part of the snapping rollers so that the snapped ears of corn will readily gravitate upon the higher part of the slanting rollers and will naturally gravitate toward the lower end of the pair of slanting rollers. Since the rollers 24 are substantially alike a description of one will apply to both. Each roller 24 contains diametrically opposite pairs of radial pins 27, 28, arranged in longitudinal series. The pins 27 are longer and have a greater radial projection than the pins 28. Each pin 27 is lodged in and projects radially from a longitudinal groove 29 and each pin 28 is lodged in and projects radially from a longitudinal groove 30, the pins 27 being in diametrically opposite grooves 29 and the pins 28 in diametrically opposite grooves 30, separated from the grooves 29 by about 90 degrees in the particular arrangement shown in Fig. 5. The several pins 27 and 28 project somewhat beyond the periphery of the respective rollers 24. Each longitudinal series of pins 27 and 28 extends for a portion of the length of the respective roller carrying them so that the upper portion of each roller is free from pins.

At the upper end of one roller 24 there is a stub shaft 31 and at the upper end of the other roller 24 there is a stub shaft 32 of greater length and connected by a universal joint 33 coupled to a short intermediate shaft 34 carried by a journal bearing 35 on a suitable portion of the main frame. At the outer end of the shaft 34 there is mounted a sprocket wheel 36 connected to a similar sprocket wheel 16 on the neighboring stub shaft 5 by a sprocket chain 38. The two stub shafts 31, 32, carry meshing pinions 39, 40, respectively, so that the rollers 24 are connected to rotate simultaneously in opposite directions and receive motion from the belt 18.

The lower ends of the two rollers 24 have their journal bearings 25 separate so that these ends of the rollers may be approached or moved further apart as desired.

With the husker of the invention suitably located in the field the corn stalks with the ears of corn thereon, are placed upon the the slats 21 so as to be fed one at a time to the husking rollers 6 and 10 in substantially parallel relation thereto, whereupon the butt ends of the stalks are engaged by the rollers and drawn between them, the ears still attached to the stalks being thereby bent at the connection with the stalks and snapped therefrom and at the same time ejected from the husks while the latter are drawn through the husking rollers with the stalks and delivered on the other side thereof for disposition in any desired manner.

The tassel end of the corn stalks passes in the enlarged space between the ends 8 and 11 of the husking rollers, whereby the corn stalks, minus the ears of corn which have been snapped therefrom, are delivered otherwise intact to the side of the machine remote from the other pair of rollers 24. The snapped-off ears contain quantities of corn silk and occasionally more or less husk, or, possibly, at times, an ear of corn will be snapped off and carry with it all the husk. Such snapped off ears drop upon the rollers 24 and, because of the slanting position of these rollers, the ears are fed to the lower or discharge end of the rollers. As soon as the ears reach the pins 27 and 28, the silk on the ears is engaged by the pins 27 and any husks which may be present are engaged by the pins 28, with the result that such husks as are present are stripped from the ears and the silk is engaged by the pins and combed out and pulled off from the ears, so that when these ears are finally discharged from the machine they are practically clean from both husks and silk.

When it is desired to use the machine the operator starts the engine 20 and feeds the corn stalks, with the leaves and ears thereon, to the upper rollers along the slats 21 when, on reaching the rollers 6 and 10, the stalks are drawn between these rollers which are close enough together to grip the stalk without crushing it. The ears with the husks thereon are located near the center of the stalk so the husks with the ears inside strike the rollers, are pulled around, the stalk passing through first, whereupon the hard ear is forced endwise out of the husk breaking the ear at the neck end and leaving the husk on the stalk so that such stalk with the leaves, the top or tassel and the empty husk pass on through the rollers to be bundled for use as fodder. The ears fall on the lower inclined rollers so that those which may have failed to be husked by the stripping rollers have the husk or parts thereof removed therefrom and the lower rollers strip the silk form the ear. In the arrangement shown the larger grooves 29 remove the ear from the husk when such removal has not taken place at the upper rollers, while the smaller grooves 30 and the pins 28 tear off the silk.

The spaces between the slats or ribs 7ª and 7ᵇ may become wet in use and slippery either from rain or heavy dew, while the spaces between the ribs clog up and the ribs will not take hold of the stalk. In such case the stalk may be moved so as to be engaged by the longer ribs 7ª beyond the shorter ribs 7ᵇ, wherefore the butt ends of the stalks are engaged and pulled through the space between the rollers, the remainder of the stalks following.

In practice the stripping rollers are conveniently made of wood and the ribs of the rollers 6 are made of metal held by screws which are counter-sunk into the ribs.

All the rollers may rotate at a speed of about 300 revolutions per minute but such speed is not obligatory.

When driving the slanting rollers 24 with the rollers 6 and 10 substantially horizontal the universal joint 33 is employed.

In order to facilitate the assembly of the machine, especially the slanting rollers 24, the universal joint 33 is connected to the roller 24, having the shaft 32 thereon, by a coupling, 41.

The machine has the advantage of relatively light weight and the capability of being transported into the field where the shocks of corn are located and the corn stalks are passed through the husking rollers without crushing or shredding. The stalks are fed to the husking rollers lengthwise of the latter leaving the husks in most part on the stalks, but the corn on the cob is ejected from the husks to fall on other rollers which, except for their slanting position, are substantially parallel with the husking rollers. The ears of corn removed from the husks and stripped of the silk are discharged into baskets, or receptacles, from which they may be placed in a wagon or other vehicle, thus avoiding any necessity of picking up the ears.

What is claimed is:

1. In a corn husking machine, a pair of snapping rollers having one end of each of smaller diameter than the other end, with one end of one roller provided with longitudinal ribs and the corresponding end of the other roller smooth.

2. In a corn husking machine, a pair of snapping rollers with one roller having a smooth surface and the other roller provided with longitudinal, circumferentially spaced ribs approaching one end of the roller and said ribs being of different lengths for the purpose set forth.

3. In a corn husking machine, a pair of snapping rollers with one roller having a smooth surface and the other roller provided with longitudinal, circumferentially-spaced ribs extending from a point intermediate of the length of the roller toward the other end of the roller and certain of the ribs extending to and the others stopping short of the other end of the roller.

4. A corn husking machine, comprising a suitable frame with means for sustaining it while moved along the ground, a pair of substantially horizontal snapping rollers located at a relatively high point on the machine, and having their snapping portions nearer to one side thereof than the other side, a hopper in part extending along those parts of the snapping rollers remote from the snapping portions thereof, a pair of associated inclined stripping rollers located in and forming the bottom of the hopper, and the stripping rollers having their high ends at a point about midway of the length of the active ends of the husking rollers at an elevation less than that of the snapping rollers.

5. In a corn husking machine, a suitable frame, superposed snapping rollers near one end of the frame and provided with snapping means nearer to one end of the pair of rollers than to the other end, slats at one side of the snapping rollers to present corn stalks to the snapping rollers, a hopper beneath the slats, and a pair of slanting stripping rollers constituting a slanting bottom for the hopper and terminating at their high ends at an intermediate point of the length of the active slanting portions of the snapping rollers.

6. In a corn husking machine, a suitable frame, superposed snapping rollers near one end of the frame and provided with snapping means nearer to one end of the pair of rollers than to the other end, slats to one side of the snapping rollers to present corn stalks to the snapping rollers, a hopper beneath the slats, and a pair of slanting stripping rollers constituting a slanting bottom for the hopper and terminating at their high ends at an intermediate point of the length of the active slanting portions of the snapping rollers, the slats diverging in a direction toward the snapping rollers.

7. In a corn husking machine, a pair of snapping rollers both larger at one end than at the other with the rollers at the larger ends approaching sufficiently close to engage and force the butt ends of corn stalks between them, the larger portion of one roller having a smooth periphery and the corresponding portion of the other roller being provided with longitudinally arranged circumferentially spaced ribs, all terminating in substantially one axial plane at a point intermediate of the length of the roller and at the other end certain of the ribs stopping short thereof and others of the ribs extending to a point close to the corresponding end of the roller.

8. In a corn husking machine, a pair of adjacent rollers, each with longitudinal grooves and radial pins projecting from the bottoms of the grooves toward the other roller and beyond the peripheral faces of the rollers, and means for rotating said rollers to cause them to move in unison, said rollers being disposed so that the grooves and the pins of one roller come opposite the smooth face of the adjacent roller, some of the grooves being deeper than the other grooves, and the pins in the deep grooves being longer than the pins in the shallow grooves.

In testimony, that I claim the foregoing as my own, I have hereto affixed my signature.

WILLIAM T. YARD.